United States Patent

Reeds, Jr.

[15] 3,685,899

[45] Aug. 22, 1972

[54] SEPARATION COLOR RECORDER SYSTEM

[72] Inventor: John W. Reeds, Jr., Thousand Oaks, Calif.

[73] Assignee: Minnesota Mining and Manufacturing Company, St. Paul, Mich.

[22] Filed: Feb. 11, 1970

[21] Appl. No.: 10,390

[52] U.S. Cl. ..............355/32, 178/5.2 D, 178/5.46 D, 178/67 A, 352/66, 355/88

[51] Int. Cl. ..............................................G03b 27/32

[58] Field of Search........178/5.2, 5.2 D, 5.4, 5.4 CR, 178/67 A, 6.7, 52 A, 6.6, 6.6 A; 352/66; 355/32, 88; 95/122

[56] References Cited

UNITED STATES PATENTS

| | | | |
|---|---|---|---|
| 2,786,386 | 3/1957 | Hoyt | 355/32 |
| 2,953,633 | 9/1960 | Hughes | 178/5.2 |

*Primary Examiner*—Samuel S. Matthews
*Assistant Examiner*—E. M. Bero
*Attorney*—Smyth, Roston & Pavitt

[57] ABSTRACT

A system to provide for the production of standard motion picture color film from a color video signal or color information composed of color components. The color video signal is decoded into its separate red, green and blue components, which components are used to provide a special form of field sequential color consisting of a repeating color group where such group contains at least one field of each of the red, green and blue components and at least one additional field of at least one of the red, green and blue components. The special form of field sequential color is recorded on standard black and white film as a black and white separation master at either 60 field per second or 50 fields per second, depending upon the field rate of the video signal, which recording is accomplished using a continuous film motion electronic beam recorder. A standard color film is made from the separation master by exposing each frame of the color film in sequence to red, green and blue separation images using appropriate color filters with the separation master.

13 Claims, 7 Drawing Figures

INVENTOR:
John W. Reeds, Jr.
By Smyth, Roston & Pavitt
ATTORNEYS

INVENTOR
John W. Reeds, Jr.
By Smyth, Roston & Pavitt
ATTORNEYS

SEPARATION COLOR RECORDER SYSTEM

The separation color recorder system of the present invention provides for the recording of color video signals or other color information by its separate red (R), green (G) and blue (B) components on a standard black and white film to form a separation master. The signal is recorded field sequentially on a frame-by-frame basis where each sequential frame represents one field of a particular one of the color components of the color video signal. Specifically, the red, green and blue components of the color video signal are converted into a special form of a field sequential signal. The special form of field sequential signal may be thought of as being composed of a repeating color group wherein such group includes at least one field of each of the red, green and blue component fields and at least one additional field of at least one of the red, green and blue components.

Specifically, for a 60-field-per-second color video signal, the color group is composed of five sequential fields and may, for example, be composed of sequential fields of the various color components in the following order: red, green, blue, red and green. This color group is repeated wherein each field represents a single color component of the color video signal and wherein the fields are sequential so that recording may be done in real time. During the printing of a color film from the black and white separation master, the first three fields of each of the color groups may be used to provide for a first frame of the color film. Specifically, the red, green and blue fields of the color group described above are used to provide for a first frame of color film. The last three fields of each color group are used to provide for a second adjacent frame of the color film. Specifically, the blue, red and green are used to provide for the second frame of the color film.

In video signals where the field rate is 50 fields per second, the color group may have the following field sequence of the component colors, red, green, blue and green. In such a 50-field-per second system, the first three colors of the color group—the red, green and blue field—are used to make a first frame of the color film, and the last two fields of each color group plus the first field of the next color group are used to make a second adjacent frame of the color film. Specifically, this would be the blue and green of a first color group and the red field of a second adjacent color group.

The use of such color groups as described above to produce the special form of field sequential color provides for an automatic conversion from the field rate of the color video signal to the frame rate of standard motion picture film. Specifically, in a 60-field-per-second color video signal, the use of five color components in each color group automatically provides for a frame rate of 24 frames per second. In the 50-field-per-second color video signal, the use of four color components in each color group provides for a frame rate of 25 frames per second for the color film, which slight deviation from the standard frame rate of 24 frames per second is not noticeable to the human eye.

The black and white separation master, composed of the color groups, is used to print the color film on a frame-by-frame basis wherein each color frame is exposed in sequence to red, green and blue separation images using appropriate color filters in combination with the separation master. The original separation master may be either a negative or a positive and the color film printed from the separation master may also either be a color positive or a color negative. This allows extreme flexibility in the recording system of the present invention to provide either color positives or color negatives, depending upon their ultimate use.

The separation color recorder system of the present invention is designed to meet a particular need for a system for converting a color video signal or a color information signal to color film. The prior art systems have included systems which photograph a cathode ray tube so as to provide for a color film from a color video picture on a cathode ray tube or from three black and white cathode ray tubes each responding to a different color component. Such a system gives a grainy picture which is objectionable and is, in a sense, equivalent to the old kinescopes. Other prior art systems for recording video signals on film do not actually produce motion picture film in a conventional sense so that the motion picture film can be projected through an ordinary projector. For example, an electron beam recorder has been used to record a color video signal using a black and white film, but the signal is recorded in an encoded form and is not on motion picture film which can be used for projection through a normal motion picture projector.

The present separation color recording system has several advantages over the prior art systems indicated above. For example, in the present invention the recording of the color video signal using the special form of field sequential color which in turn is recorded on black and white film, is accomplished in real time so that the recording may be live as well as from video tape. Since the separation master is on black and white film, the separation master is a permanent recording which is not subject to dye color fading.

Another advantage with the separation color recording system of the present invention is that the system includes inherent color registration, since all images are recorded with the same electron beam on the same film. Also, any non-linearities would match for all of the color fields and any film shrinkage would also tend to be equal on all of the color fields which are recorded in black and white. In addition, since all of the separation images are on the same film, there is no indexing problem in printing.

Other advantages in the system are the recording with an electron beam so as to allow the use of fine grain film. All of the printing can be done with adequate light so that fine grain film may be used throughout, thereby avoiding the graininess or low-resolution image characteristic of high-speed film.

Another advantage of the present invention is that there is no split field recording in the separation color recorder system of the present invention. Alternate color fields are interlaced on printing to minimize serrated edges on images caused by the raster lines.

Editing of the separation master may be accomplished without upsetting the color sequence merely by removing any multiple of five fields which form a color group for the 60-field-per-second system or any multiple of four fields which form a color group for the 50-field-per-second system. Another advantage is that the separation images allow for independent control in printing all three colors, thereby allowing for optimum color balance in the printing.

The separation color recorder system of the present invention includes two subsystems. The first subsystem is for the conversion of the encoded color video signal for recording on the black and white separation master. Specifically, the encoded color video signal is decoded into its separate red, green and blue components. These components are then fed into a field switcher which, in sequence, selects single fields of each color and provides an output of field sequential color in either of the color groups described above. For example, for the 60-field-per-second system, the color fields may be recorded in repeating groups of five, which may take the sequence of red, green, blue, red and green (RGBRG). As indicated above, the reason for this unusual color sequence is that it allows five separation color images to be printed as two color frames, which automatically provides the conversion from the 60-field-per-second television rate to the 24 frames per second required for motion picture film. Each blue separation image is used on two frames of color film but the red and green are each used for only one frame.

As indicated above, the system may also operate for a 50-field-per-second television rate using repeating color groups of four which may take the sequence, red, green, blue and green (RGBG), which in turn is printed onto two color print frames to provide for a 25-frame-per-second color film. It is to be appreciated that the specific sequence of colors and the choice of which colors are duplicated and which colors are used more than once in the printing of the color film are arbitrary and may be varied. For example, in the 60-field-per-second system, the sequence could be green, red, blue, green and red (GRBGR) and in the 50-field-per-second system the sequence could be red, green, red and blue (RGRB). Actually, any sequence could be used as long as each color component is included at least once in each color group and wherein at least one of the color components is included at least twice in the color group.

In order to be able to record 50 or 60 fields per second without lost time for film pulldown, a continuous film motion transport is used in the electron beam recording. Therefore, the color separation images forming the color groups are recorded using a continuous electron beam recorder whereby the recording electron beam is scanned horizontally and the film motion itself provides the vertical scan. It is to be appreciated that the electron beam recording is accomplished on black and white film, which black and white film is very fine grain film, so as to provide for high resolution in the resultant image.

Once the black and white separation master is prepared, a color print may be produced from such black and white separation master using a second subsystem. Specifically, the color printer provides for the printing of each frame of the color film by exposing each frame in sequence to red, green and blue separation images in the particular order dictated by the order of separation images in each color group. The film is exposed to the various red, green and blue separation images using the appropriate color filters. The printer, for example, may use a continuously rotating filter wheel and shutter with intermittent film motion in both the projector and camera whereby all components are driven in proper phase by a common drive motor.

A clearer understanding of the invention will be had with reference to the following description and drawings, wherein.

Figure 4:
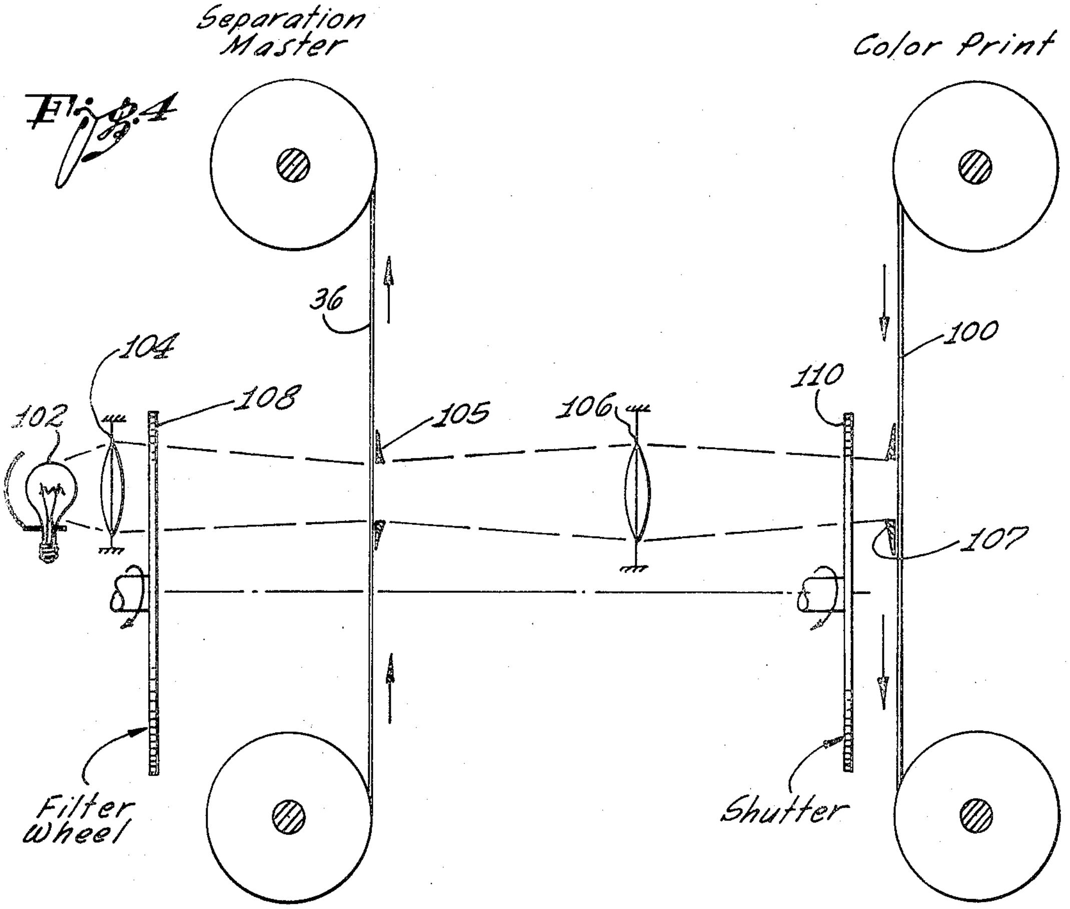
FIG. 4 illustrates a color printer for providing for a color film from the black and white separation master, as shown in FIG. 2.
Figures 4A, 4B, 5:
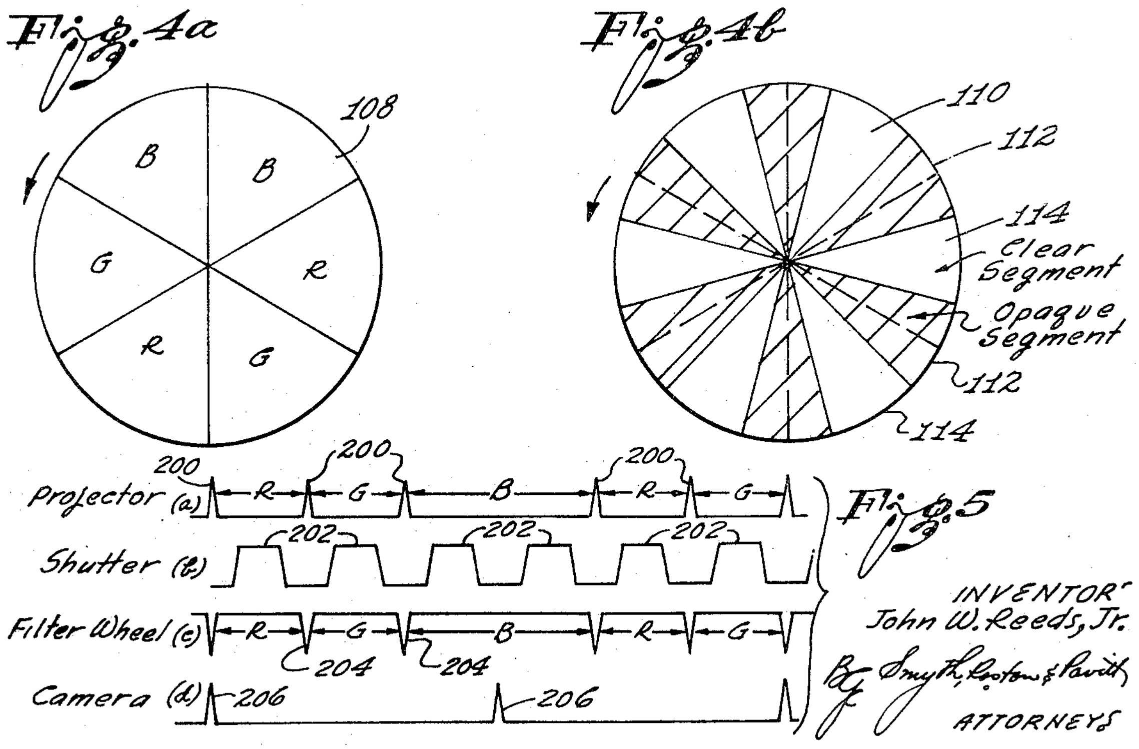
FIG. 4*a* illustrates in more detail the filter wheel of FIG. 4.

FIG. 4*b* illustrates in more detail the shutter of FIG. 4; and

FIG. 5 illustrates the stepping sequence for the various components of the color printer of FIG. 4.

Figure 1:
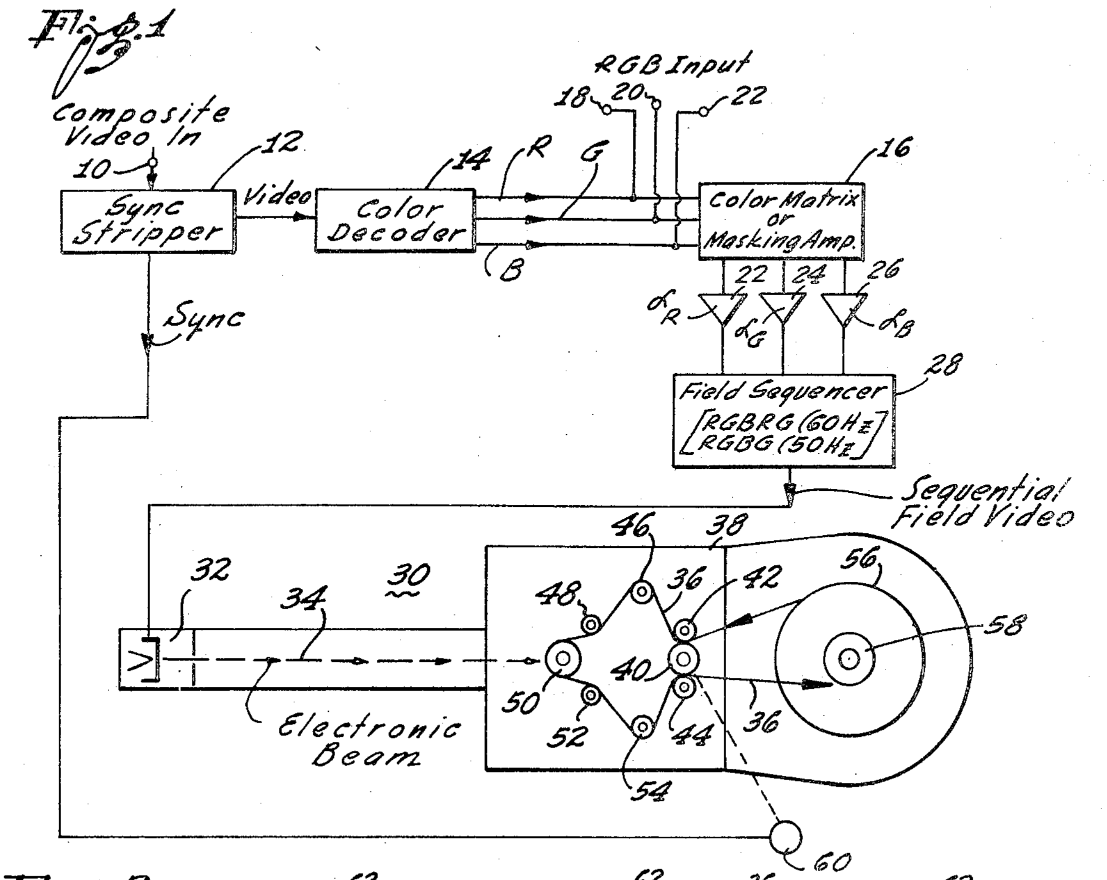
FIG. 1 illustrates, in block diagram form, a color recorder for producing a black and white separation master from a color video signal or from color information.

In FIG. 1, a block diagram of a color recorder is shown, which color recorder produces a black and white separation master from color information. Specifically, a composite video signal is applied to a terminal 10, which signal may be from a color signal which has been previously recorded on video tape and which includes the sync signal. The composite video signal is then applied to a sync stripper 12 which removes the sync signal and produces a color video signal to be applied to a color decoder 14. The sync signal may be used to control the speed of operation of an electron beam recorder, as will be explained at a later time.

The color decoder 14 decodes the color video signal into its separate red, green and blue components and basically is the same type of circuitry used in every home color television set. The red, green and blue signals are then applied to a color matrix or masking amplifier 16. It is also to be noted that the red, green and blue signals may be applied directly from the color camera using the terminals 18, 20 and 22. Also, any form of color information may be applied as separate color components to the terminals 18, 20 and 22. The color recorder of the present invention will operate in real time so that recording may be done live as well as from video tape.

The color matrix or masking amplifier 16 may be used to select a new set of coordinates depending upon the characteristics of the color film which will ultimately be printed from the separation master. Essentially, the color matrix or masking amplifier 16 provides for a mixing of the components of the colors different from that normally provided in the color video signal. This color matrix or masking amplifier 16 may not be necessary if the color film is selected to have the proper characteristics to match the coordinates for the red, green and blue signals which is standard with the color video signal.

The output from the color matrix or matching amplifier 16 are the color signals red, green and blue shown to be red', green' and blue' (R', G' and B') depending upon the change in the coordinates by the color matrix or matching amplifier, and such signals are applied separately to amplifiers 22, 24 and 26. The amplifiers 22, 24 and 26 may be used to correct for the slope of the intensity characteristics of the different color components so as again to correct for the characteristics of the color film. As with the color matrix or matching amplifier 16, the amplifiers 22, 24 and 26 may be eliminated if the color film has the proper characteristics.

Essentially, the red, green and blue components of the color information are applied to a field sequencer 28 which provides for a sequential field signal having a specific field sequence including repeating color groups, which color groups may either include five color components for a 60-field-per-second color signal or four color components for a 50-field-per-second television rate.

The color groups contain at least one of each of the red, green and blue color fields and at least an additional one of at least one of the color fields is repeated. As a particular example, the field sequencer may provide for sequential color fields in the following order for 60-fields-per-second television: red, green, blue, red and green (RGBRG). It can be seen that this color group includes at least one of each of the color components and also includes additional ones of two of the color components. As an example for 50-fields-per-second television, the color group may include the following components: red, green, blue and green (RGBG). Again it can be seen that each of the color components is represented at least once in the color group and an additional one of at least one of the colors is included in the color group.

This particular form of field sequential video wherein a repeating color group is provided is used so as to provide for a direct conversion from either 50- or 60-fields-per-second television to approximately 24-frames-per-second color film. Specifically, the color group including five color components used with the 60-fields-per-second television provides directly for a color film of 24 frames per second, and the color group including 4 color components used with the 50-field-per-second television provides for a color film frame rate of 25 frames per second. The difference of one frame per second would normally not be detectable to a viewer.

The sequential field video signal from the field sequencer 28 is applied to an electron beam recorder 30 which includes an electron gun 32, which gun produces an electron beam 34 directed to a black and white film 36 contained within a film magazine 38. Specifically, the black and white film 36 is driven continuously using capstan 40 and pinch rollers 42 and 44 and the path of the film 36 is controlled by idler rollers 46, 48, 52 and 54. The capstan 40 is driven by a motor 60, which motor has its speed controlled in accordance with the sync signal which is provided by the synch stripper 12. The use of the original sync signal insures that the film drive is in sync with the field rate so as to provide for an accurate black and white separation master. Idler roller 50 has a large diameter and the electron beam actually strikes the black and white film 36 as it is passing over the idler roller 50. The film 36 is driven from a first reel 56 and taken up by a reel 58. The reels are shown to be on the same axis but it is to be appreciated that the specific arrangement of the reels within the magazine 38 may take many forms and is not limited to that shown in FIG. 1.

The electron beam recorder 30 provides for a continuous movement of the black and white film 36 so that the electron beam 34 is deflected horizontally to provide for the horizontal scan and the film motion of the black and white film 36 provides for the vertical scan. The film reels 56 and 58 are driven by torque motors.

It can be seen, therefore, that the color recorder of FIG. 1 provides for a black and white separation master, which separation master has frames which are recorded sequentially with individual color fields formed in color groups and which frames are in accordance with the characteristics of the original color information. The black and white separation master, therefore, has recorded single frames representing each color in a particular field sequence forming the color groups, which black and white separation master may then be used to produce a color film as shown in FIGS. 2 and 3.

Figure 2:
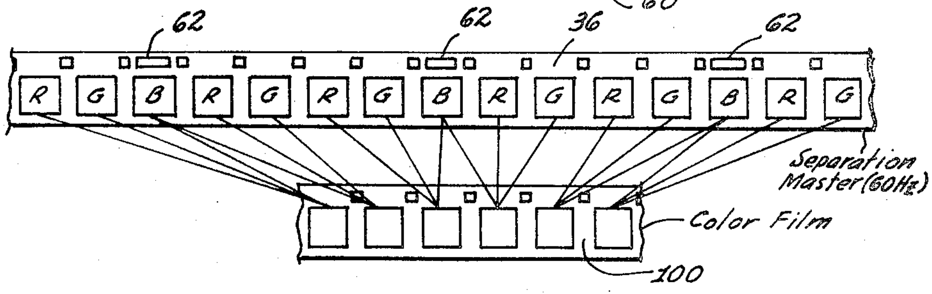
FIG. 2 illustrates how the color groups, including the color components on the black and white separation master, are used to provide for the individual frames on the color film for a 60-field-per-second television rate.
Figure 3:
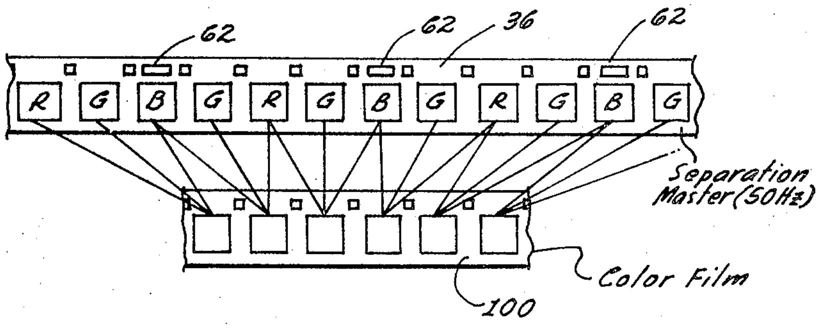
FIG. 3 illustrates how the color groups, including the component colors recorded on the black and white separation master, are used to provide for the individual frames on the color film for a 50-field-per-second television rate.

FIG. 2 illustrates the method of conversion from a 60-field-per-second television rate separation master to a 24-frames-per-second color film. FIG. 3 illustrates a conversion from a 50-field-per-second television rate separation master to a 25-frame-per-second color film.

As shown in FIG. 2, the separation master 36 contains single frames representing single fields of the various components of the color video signal. Specifically, the fields are broken down into color groups of five fields, alternating in the following manner: red, green, blue, red and green (RGBRG), and then repeating. Three such color groups are shown in FIG. 2, since 15 sequential fields are shown recorded on the black and white separation master.

The individual frames of the color film are produced using particular ones of the frames in the black and white separation master. Specifically, the first three fields representing red, green and blue (RGB) are used to produce a first frame of color film. The next frame of color film is produced using the last three fields of the first color group, which are the blue, red and green (BRG) fields. It can be seen that the blue field is used twice and that appropriate motion of the separation master and the color film must be provided so as to allow for the use of the blue field twice.

It is to be appreciated that the particular order of fields within each color group may be varied and that other fields other than the blue field may be used twice, but each group must contain at least one of each of the three color components and each group must have at least an additional one of at least one of the color components. The five fields in each color group, therefore, are used to produce two frames of the color film, thereby providing for an automatic conversion from the 60-field-per-second television rate to the 24-frames-per-second motion picture rate. The separation master 36 shown in FIG. 2 may also include an opaque section 62 which may be used as a visual indication of a particular one of the colors in each color group. Since, in our particular example, the blue color is used only once in each color group, a visual indication of the blue is useful in identifying the location of the blue fields and thereby helping to initially set up the separation master for producing the color film.

In FIG. 3, the black and white separation master 36 includes four components in each color group and specifically includes sequential fields of red, green, blue and green (RGBG) to provide for each color group. A first frame of the color film 100 is produced using the first three components of the color group. Specifically, this is the red, green and blue component (RGB). The next frame of the color film is produced using the last two of each color group and the first color component of the next color group. Specifically, this would be the blue, green and red (BGR) color components. In the particular example shown in FIG. 3, the red component is used to provide for a portion of two of the frames of the color film, as is the blue component. Basically, however, the color group of four color components is used to produce two frames of color film thereby providing for a conversion from the 50-field-per-second television rate to 25 frames per second which is an approximation of the 24 frames per second required for motion picture film.

FIGS. 4, 4*a* and 4*b* illustrate a specific system for converting from the black and white separation negative 36 to a color film 100 and are specifically related to the conversion from the 60-field-per-second television rate to the 24-frame-per-second motion picture film rate. It is to be appreciated, however, that the system shown in FIG. 4 may also be used to provide for the conversion from the 50-field-per-second television rate to the 25-frame-per-second motion picture film rate merely by changing the filter wheel and the stepping procedure for the separation master and the color film.

In FIG. 4, the color printer includes a projector having a light source 102 and a lens 104 and, in addition, includes light stops 105 and 107 and lens 106 to project the image on the separation master 36 on the color print 100. The separation master 36 and color film 100 are driven with intermittent film motion in a manner to be described with reference to FIG. 5. Included within the system of FIG. 4, however, is a filter wheel 108 and a shutter 110 which are driven continuously. All of the driven items, such as the filter wheel 108, the separation master 36, the shutter 110 and the color print 100 may be driven in proper phase by a common drive motor.

The filter wheel 108 may be subdivided into six sectors as shown in FIG. 4*a*, with each sector of a different color. Specifically as shown in FIG. 4*a*, and starting at 12 o'clock and going clockwise, the various sectors have the following colors; blue, red, green, red, green and blue. It can be seen that the two blue sectors are adjacent to each other so as to provide for the double use of the blue component in adjacent frames of the color film. This is shown with reference to FIG. 2. The red and green sectors of the color wheel 108 are duplicated but are not located adjacent to each other. The various colors and their particular sequence in the color wheel 108 of FIG. 4*a* follow the color components in the sequential fields present on the separation master with the exception as noted above that the blue sector of the filter wheel is duplicated to allow for the use of the blue field in the separation master in two adjacent color films. It is to be appreciated that an appropriate color wheel may be provided for the separation master shown in FIG. 3 for use with a 50-field-per-second television rate.

The shutter 110 shown in more detail in FIG. 4*b* includes opaque segments 112 and clear segments 114. The shutter, therefore, provides for the passage of light to the color print whenever a clear segment 114 is in the appropriate position. It can be seen, therefore, that as the filter wheel 108 rotates, it provides for light of various colors being transmitted through the black and white separation master and with the light actually transmitted to the color film 100 in accordance with the operation of the shutter 110. The filter wheel 108 and the shutter 110, therefore, must be synchronized with the movement of the black and white separation master and the color film so that the proper color lights are passed through the black and white separation master to provide for the proper colors in the color film 100. Specifically, when a frame on the black and white separation master 36 appears which represents red information, the red portion of the filter wheel should be in the proper position so that red light is transmitted to the black and white separation master 36 and toward the color film. This, of course, is true with the other colors represented in the black and white separation master 36.

The specific operations of the various members of the film color printer of FIG. 4 are shown in FIG. 5. Specifically, the stepping of the projector so as to move the separation master 36 is shown in FIG. 5(*a*). The operation of the shutter is shown in FIG. 5(*b*), the operation of the filter wheel is shown in FIG. 5(*c*) and the movement of the camera or the color film is shown in FIG. 5(*d*).

The movement of the projector or the separation master 36 is intermittent and as shown in FIG. 5(*a*) the stepping of the separation master is represented by the pulses 200. Specifically, starting with the lefthand portion, the projector steps the separation master 36 so as to provide for the red field for projection. At the next step, the green field is provided for projection, and at the next step, the blue field is provided for projection. It can be seen, however, that the blue field is provided for a period of approximately twice as long as the period provided for the green and red fields.

The operation of the shutter is shown in FIG. 5(*b*) and the shutter is open during the periods represented by the pulses 202. It can be seen that the shutter is open only during the periods when the separation master is stationary. The operation of the filter wheel as shown in FIG. 5(*c*) provides for the appropriate portions of red, green and blue corresponding to the stepping of the separation master. That is, when the separation master has a red field in position for projection, the filter wheel has a red portion in position so that a red light is projected through the black and white separation master. Accordingly, the green and blue portions of the filter wheel are also presented when the green and blue fields of the separation master are present for projection. Therefore, the filter wheel, although rotated continuously, provides for the various colored sectors to be presented in turn and with a change from one sector to another represented by the pulses 204. Finally, as shown in FIG. 5(*d*), the camera steps the film 100 at the positions represented by the pulses 206 and in the remaining interval the color film is stationary.

It can be seen, therefore, that during a particular stationary period for the color film 100 between steps 206, the projector provides for the separation master to have fields corresponding to red, green and blue in stationary positions and whereby light of the proper color is projected through the filter wheel to the black and white separation master and wherein the shutter is open to allow that light to impinge on the color film for each of the three color components. At the time the light impinges on the color film, the separation master is stationary and the color film is stationary. The shutter and wheel are both rotated constantly but are provided with sufficient overlaps so that no light is transmitted to the color film when either the separation master or the color film is being moved. It is to be appreciated that a similar arrangement is to be used when converting from a separation master having color groups with color components corresponding to a 50-field-per-second television rate as shown in FIG. 3.

The present system thereby provides for a separation color recorder system for converting color information to color film using an intermediary black and white separation master. The recording may be done in real time and the master recording is on black and white film to provide for a permanent record. The system has inherent color registration since all images are recorded on the same film which eliminates problems of film shrinkage and indexing. The actual recording on a black and white master is accomplished using an electron beam recorder to allow the use of fine-grained film. There is no split field recording and editing of the separation master may be accomplished merely by removing multiples of the color groups. In addition, the use of black and white separation images on the separation master allows for independent control in the printing of all of the colors so as to provide for optimum color balance.

The present invention is only to be limited by the appended claims.

I claim:

1. A color printer for printing color film from color information reproduced on a black and white separation master wherein the black and white separation master includes sequential frames representing sequential fields of individual color components of the color information, including first means for supporting and providing movement of the black and white separation master, second means for supporting and providing movement of the color film, third means for directing light energy through the black and white separation master and toward the color film, and fourth means coupled to the first and second means for controlling the movement provided by the first and second means so that the black and white separation master is successively moved to present the sequential frames representing the sequential fields of the individual color components, and so that the color film is moved to receive at each frame of the color film a group of the sequential frames, which group includes all of the individual color components of the color information.

2. The color printer of claim 1 additionally including a filter wheel located between the third means and the color film and with the filter wheel including segments having colors corresponding to the individual color components of the color information.

3. The color printer of claim 1 wherein periodic ones of the sequential frames on the black and white separation master are used as part of the group of sequential frames for two successive frames of the color film.

4. A color printer for printing color film from color information reproduced on black and white film wherein the black and white film includes sequential frames formed in groups wherein each group includes frames representing all of the individual color components and includes at least one additional frame representing at least one of the color components, including first means for supporting and providing movement of the black and white film, second means for supporting and providing movement of the color film, third means for directing light energy through the black and white film and toward the color film to expose the color film in accordance with the information contained on the black and white film, and fourth means coupled to the first and second means for controlling the movement provided by the first and second means so that each frame of color film receives light energy through sequential frames of black and white film representing all of the color components and wherein at least one frame in each group is used for the exposure of two successive frames of color film.

5. The color printer of claim 4 wherein the black and white film has been recorded at 60 frames per second and wherein each group contains five frames and wherein each group of five frames on the black and white film is used to provide two frames on the color film so as to provide for a conversion to the standard frame rate of motion picture film.

6. The color printer of claim 4 wherein the black and white film has been recorded at 50 frames per second and wherein each group contains four frames and wherein each group of four frames on the black and white film is used to provide two frames on the color film so as to provide for a conversion to the standard frame rate of motion picture film.

7. A system for converting color information which is composed of a plurality of color components to motion picture color film using an intermediate black and white separation master, including first means responsive to the color information for producing a field sequential signal wherein each sequential field represents a particular one of the plurality of color components of the color information, second means coupled to the first means and the black and white separation master and responsive to the field sequential signal for recording on the black and white separation master sequential frames corresponding to each sequential field in the field sequential signal, third means for supporting and providing movement of the black and white separation master, fourth means for supporting and providing movement of the color film, fifth means for directing light energy through the black and white separation master and toward the color film, and sixth means coupled to the third and fourth means for controlling the movement provided by the third and fourth means so that the black and white separation master is successively moved to present the sequential frames representing the sequential fields of the individual color components, and so that the color film is moved to receive at each frame of the color film a group of the sequential frames which group includes all of the individual color components of the color information.

8. The system of claim 7 wherein the sequential fields in the field sequential signal are grouped into a continuously repeating color group, which color group includes at least one sequential field of each of the color components in the color information and wherein at least one additional sequential field of at least one of the color components is included in the color group.

9. A separation color recording system for converting color information composed of color components to motion picture color film using a separation master, including first means responsive to the color information for producing a field sequential signal which signal is composed of a continuously repeating group of sequential fields forming a color group wherein each sequential field represents a particular one of the color components and wherein each color group includes at least one sequential field of each of the color components and at least one additional sequential field of at least one of the color components, and second means coupled to the first means and responsive to the field sequential signal for recording each sequential field on the separation master as individual sequential frames, third means for supporting and providing movement of the separation master, fourth means for supporting and providing movement of the color film, fifth means for directing light energy through the separation master and toward the color film to expose the color film in accordance with the information contained on the separation master, and sixth means coupled to the third and fourth means for controlling the movement provided by the third and fourth means so that each frame of color film receives light energy through sequential frames of the separation master representing of the color components and wherein at least one frame in each group is used for the exposure of two successive frames of color film.

10. The separation color recording system of claim 9 wherein the color information occurs at a rate of 60 fields per second and wherein each color group includes five sequential fields.

11. The separation color recording system of claim 9 wherein the color information occurs at a rate of 50 fields per second and wherein each color group includes four sequential fields.

12. A method of producing a color motion picture film from color information composed of a plurality of color components, including the following steps:

producing a repeating field sequential signal having each field representing a different one of the color components of the color information, recording the repeating field sequential signal on a separation master as a plurality of sequential frames and with each frame representing a different one of the fields, and printing a color film from the separation master with a plurality of frames representing all of the color components used to print each frame of the color film.

13. A method of producing a color print from color information composed of color components recorded on a black and white separation master, including the steps of:

producing a field sequential signal composed of a repeating color group wherein each group includes fields representing each of the color components and wherein each group includes at least one additional field representing at least one of the color components, and recording the field sequential signal on a separation master as a plurality of sequential frames and with each frame representing a different one of the fields, and producing a color print from the separation master wherein each of the color groups is used in the production of more than one frame on the color film.

* * * * *

Disclaimer 3,685,899.—*John W. Reeds, Jr.*, Thousand Oaks, Calif. SEPARATION COLOR RECORDER SYSTEM. Patent dated Aug. 22, 1972. Disclaimer filed Sept. 12, 1973, by the assignee, *Minnesota Mining and Manufacturing Company*.

Hereby enters this disclaimer to claims 1 and 2 of said patent.

[*Official Gazette December 11, 1973.*]